United States Patent
Lu et al.

(10) Patent No.: US 8,347,132 B2
(45) Date of Patent: Jan. 1, 2013

(54) SYSTEM AND METHOD FOR REDUCING PROCESSOR POWER CONSUMPTION

(75) Inventors: Lee-Chung Lu, Taipei (TW); Chung-Hsing Wang, Baoshan Township (TW); Myron Shak, San Jose, CA (US); Wei-Pin Changchien, Taichung (TW); Kuo-Yin Chen, Hsin-Chu (TW); Chi Wei Hu, Pingzhen (TW); Kevin Hung, Hsin-Chu (TW); Wu-An Kuo, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 476 days.

(21) Appl. No.: 12/619,428

(22) Filed: Nov. 16, 2009

(65) Prior Publication Data

US 2010/0174933 A1 Jul. 8, 2010

Related U.S. Application Data

(60) Provisional application No. 61/143,079, filed on Jan. 7, 2009.

(51) Int. Cl.
*G06F 1/00* (2006.01)

(52) U.S. Cl. ........ 713/322; 713/300; 713/320; 713/323; 713/324; 713/340; 713/600; 713/601

(58) Field of Classification Search .................. 713/300, 713/320, 322, 323, 324, 340, 600, 601
See application file for complete search history.

(56) References Cited

U.S. PATENT DOCUMENTS 8,015,426 B2 * 9/2011 VanStee et al. ............... 713/324
8,024,591 B2 * 9/2011 Bertelsen et al. ............. 713/323

* cited by examiner

*Primary Examiner* — Jaweed A Abbaszadeh
(74) *Attorney, Agent, or Firm* — Slater & Matsil, L.L.P.

(57) ABSTRACT

A system and method for reducing active power in processors is disclosed. A method embodiment comprises the steps of determining when a particular logic block is inactive, determining the powered state of the particular logic block, isolating the particular logic block from a main processor core, and powering off the particular logic block. When the system needs the particular logic block, the method further comprises reactivating the block. A system embodiment comprises software and a processor coupled to a clock control module, an isolation control module and a header/footer module, operable to isolate a particular logic block and power off a particular logic block, thereby reducing power. Another embodiment comprises a logic module coupled to a clock by a clock gating module, an isolation module for isolating the logic module, a header/footer module for disabling power to the logic module, and a power and clock gating control module for controlling the clock gating module and the header/footer module.

20 Claims, 6 Drawing Sheets

```
System Instructions
include < stdio.h >
main()
{ :
  :Enable target block
  Wait until power supply is ready
  :
  :Disable target block
  :
}
subroutine()
subroutine()
```
— 203

FIGURE 3

SYSTEM AND METHOD FOR REDUCING PROCESSOR POWER CONSUMPTION

This application claims the benefit of U.S. Provisional Patent Application Ser. No. 61/143,079, filed on Jan. 7, 2009, and entitled "System and Method for Reducing Processor Power Consumption," which application is incorporated herein by reference.

TECHNICAL FIELD

The present invention relates generally to a system and method for reducing processor power consumption, and more particularly, to a system and method for decreasing leakage power losses in processor systems.

BACKGROUND

Generally, modern processors employ varying methods of clock gating to decrease power consumption. Processors use electrical signals called clock signals to advance operations within the system by clocking synchronous elements. The system typically sends a clock signal at regular intervals, and the signal instructs the synchronous elements to operate. Clock gating adds logic elements to a system design to disable the clock to inactive elements in the system. In traditional system operation, the clock regularly instructs the synchronous elements to operate. Each time a particular clock operates synchronous elements, those synchronous elements controlled by the particular clock draw operating power. Those skilled in the art refer to power consumed in response to clock signals as dynamic power. Even when the synchronous elements are not performing a function, the synchronous elements continue to consume dynamic power every time the system sends a clock signal. Clock gating inserts logic into the system in order to control which synchronous elements the clock operates. When particular elements within the system are inactive, the logic gates prevent the element from receiving the clock signal. Consequently, the element does not operate and does not draw dynamic power.

While prior art clock gating methods reduce the dynamic power load from a system, the inactive elements continue to draw power even when isolated from the clock. The continued power draw originates from the need to maintain the elements in a ready state for the next operational clock period. Persons skilled in the art refer to the continued power draw as leakage power, or leakage power loss. Clock gating on its own does not reduce leakage loss. Leakage loss poses a serious problem. As devices continue to decrease in size, lower voltage supplies are used to operate a system, necessitating processor systems that consume less power. Additionally, as battery operated applications in processors increase, persons skilled in the art continue to seek methods that increase the efficient use of power.

One prior art method designed to reduce leakage power loss involved creating a sleep mode process. A system utilizing a sleep mode process will remove power from all elements of the system outside of those that are needed to restore the system to its operating state. However, sleep mode incurs a time penalty, or wake up penalty, in that it takes a significant amount of time, or a significant number of clock periods to restore power to those elements that have had power removed from them. Therefore, there is a need for a system and/or method for improved power reduction in modern processors that addresses at least some of the problems and disadvantages associated with conventional methods.

SUMMARY OF THE INVENTION

These and other problems are generally solved or circumvented, and technical advantages are generally achieved, by preferred embodiments of the present invention which provide improved methods for reduction of active power in processors.

In accordance with an embodiment of the present invention, a method for reducing active power in processors comprises the steps of determining when a particular logic block is inactive; determining the powered state of the particular logic block; isolating the particular logic block from a main processor core, and powering off the particular logic block. When the system subsequently needs the particular logic block, the method further comprises reactivating the block.

In accordance with another embodiment of the present invention, a computer readable medium containing software instructions, that, when executed by a processor reduce processor power consumption by receiving a clock gating control instruction for a particular logic block, wherein the clock gating control instruction comprises an instruction to selectively enable or disable a clock signal, in the event that the clock gating control instruction disables the clock signal to the particular logic block, isolating the particular logic block from a processor core, and disabling power to the particular logic block, and in the event that the clock gating control instruction enables the clock signal to the particular logic block and the particular logic block does not receive power, re-activating the particular logic block.

The computer readable medium includes non-volatile storage such as flash, CD and DVD disks, floppy disk, USB drives, and hard coded storage such as ROM, and a volatile memory such as SRAM and DRAM. The storage may be within the processor.

In accordance with another embodiment of the present invention, a system for reducing processor power consumption comprises a clock gating control logic module, coupled to a power and clock gating control logic module, and configured to selectively transmit a first clock gating control signal. The power and clock gating control logic module is further coupled to a header/footer module, an isolation control logic module, a first logic circuitry, and a second logic circuitry, and configured to receive the first clock gating control signal, and a power status signal, and selectively transmit a second clock gating control signal, a power control signal, an isolation control signal, and a third clock gating control signal. The header/footer module is further coupled to the particular logic block, and configured to receive the power control signal, and selectively transmit the power status signal. The isolation control logic module is further coupled to the particular block and the core processor, and configured to receive the isolation control signal. The particular logic block is further coupled to the first logic circuitry, and configured to receive a second clock signal. The first logic circuitry is further coupled to a clock generator, and configured to receive a first clock signal and the second clock control signal, and transmit the second clock signal. The clock generator is further coupled to a third logic circuitry, and configured to generate the first clock signal and a third clock signal. The second logic circuitry is further coupled to a core processor and configured to receive the third clock control signal and a fourth clock control signal, and transmit a fourth clock signal. The third logic circuitry is further coupled to a second clock control logic module, and configured to receive the third clock signal and a fifth clock control signal and transmit the fourth clock control signal. The second clock control logic module is configured to transmit the fifth clock control signal. Finally, the core processor is configured to receive the fourth clock signal.

An advantage of a preferred embodiment of the present invention is that the method allows for increased power reduction during operation of the processor by reducing dynamic power losses and leakage power losses by disabling the power source to inactive elements based on clock gating signals. A further advantage of a preferred embodiment of the present invention is that the method eliminates the wake up penalty of prior art methods by allowing the system software to remain in control when some portions are power gated.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 is a schematic diagram of the object code in accordance with an embodiment of the present invention;

DETAILED DESCRIPTION OF ILLUSTRATIVE EMBODIMENTS

Figure 1:
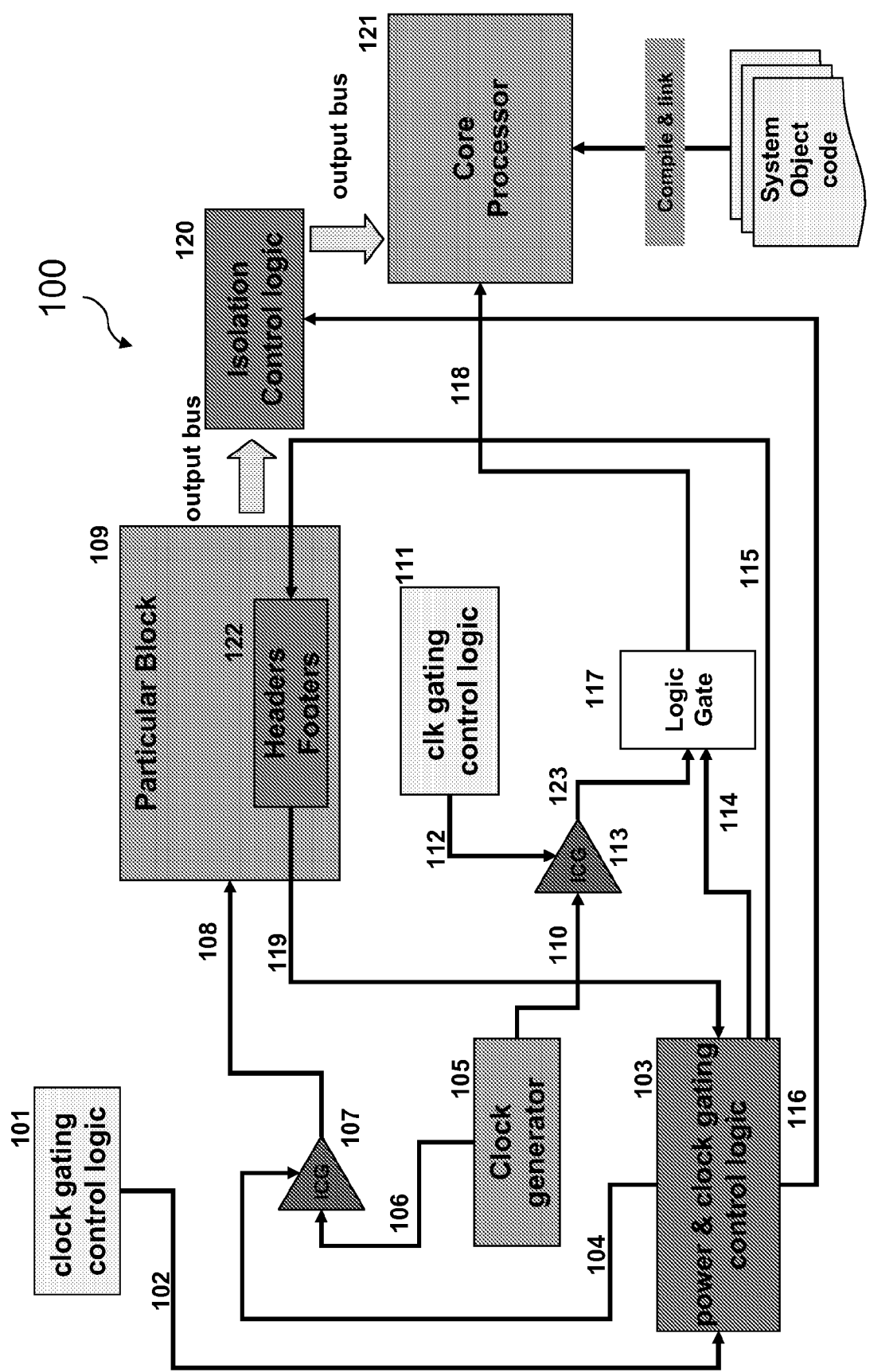
FIG. 1 is a block diagram of a hardware embodiment of the present invention in accordance with one embodiment.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or in some combinations thereof. In a preferred embodiment, however, the functions are performed by a processor such as a computer or an electronic data processor in accordance with code such as computer program code, software, and/or integrated circuits that are coded to perform such functions, unless indicated otherwise.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus or otherwise tangible medium that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Referring now to the drawings, FIG. 1 is a schematic diagram illustrating certain components of a system 100 for reducing processor power consumption, in accordance with one embodiment of the present invention. System 100 comprises hardware elements, which perform operative functions for reducing processor power consumption. System 100 further comprises a first clock gating control logic module 101, a first clock control signal 102, a power and clock gating control logic module 103, a second clock control signal 104, a clock generator 105, a first clock signal 106, a first logic gate 107, a second clock signal 108, a particular logic block 109, and a third clock signal 110. System 100 further comprises a second clock gating control logic module 111, a third clock control signal 112, a second logic gate 113, a fourth clock control signal 114, a power control signal 115, an isolation control module signal 116, a third logic gate 117, a fifth clock signal 118, a power status signal 119, an isolation control logic module 120, a core processor module 121, a header/footer logic module 122, and a fourth clock signal 123.

In the illustrated embodiment, clock gating control logic module 101 comprises logic circuitry that, after receiving an appropriate instruction from system 100, performs the operative functions designed to either enable or disable the clock of particular logic block 109. Clock gating control logic 101 generates first clock control signal 102, comprising an instruction to enable clock gating or disable clock gating.

In the illustrated embodiment, power and clock gating control logic module 103 comprises logic circuitry such that, in response to input from first clock control signal 102 and power status signal 119, performs the operative functions necessary to control power and clock gating for system 100. Power and clock gating control module 103 generates second clock control signal 104, fourth clock control signal 114, power control signal 115, and isolation control signal 116.

In the illustrated embodiment, clock generator 105 generates first clock signal 106 and third clock signal 110. Clock generator 105 comprises logic circuitry, which perform the operative functions necessary to generate clock signals. First clock signal 106 and third clock signal 110 are system clock signals used to operate the clocks of particular logic block 109 and core processor 121, respectively.

In the illustrated embodiment, first logic gate 107 is a combinatorial logic function. More specifically, first logic gate 107 receives second clock control signal 104 and first clock signal 106, and in response, first logic gate 107 generates second clock signal 108.

In the illustrated embodiment, particular logic block 109 is an optional logic block. For example, in various systems particular logic block 109 comprises mBIST circuitry or otherwise optional modules. Particular logic block 109 receives second clock signal 108 and operates in response to an enable clock second clock signal 108.

The present method inserts one or more header/footer logic modules 122 into logic block 109. Header/footer logic module 122 comprises logic circuitry placed between the power source and particular logic block 109 or between particular logic block 109 and the ground. When header/footer logic module 122 receives a power gating enabled signal from power and clock gating control logic module, header/footer logic module performs the operative functions necessary to interrupt the power supply to particular logic block 109. Specifically, header/footer logic module 122 receives power control signal 115 and generates power status signal 119.

In the illustrated embodiment, particular logic block 109 communicates with isolation control logic module 120 through a system bus. In turn, isolation control logic module 120 communicates with core processor 121 through a system bus. Isolation control logic module 120 comprises logic circuitry configured to represent to core processor 121 that particular logic block 109 is not an unknown element. Isolation control logic module 120 receives isolation control logic module signal 116 and controls communication between particular logic block 109 and processor core 121.

In the illustrated embodiment, second clock gating control logic module 111 comprises logic circuitry that, after receiving the appropriate signal from system 100, performs the operative functions designed to either enable or disable the clock of core processor 121. Second clock gating control logic 111 generates third clock control signal 112, comprising an instruction to enable clock gating or disable clock gating.

In the illustrated embodiment, second logic gate 113 is a combinatorial logic function. More specifically, second logic gate 113 receives third clock control signal 112 and third clock signal 110, and in response, second logic gate 113 generates fourth clock control signal 123.

In the illustrated embodiment, third logic gate 117 is a combinatorial logic function designed to provide a clock enable signal when both inputs comprise enable signals. More specifically, third logic gate 117 receives fourth clock control signal 114, fourth clock signal 123 and generates fifth clock signal 118. Fifth clock signal 118 comprises an instruction to operate or not operate the clock of core processor 121.

In the illustrated embodiment, core processor 121 comprises circuitry designed to perform operative functions similar to that of a typical processor. As shown in FIG. 1, core processor 121 executes system object code, which allows system 100 to perform executable functions. For instance, system object code could comprise instructions to perform the clock gating process to reduce dynamic power.

In an illustrative operative embodiment of system 100, the system determines whether logic block 109 is inactive. In the event that the logic block is inactive, system 100 enables clock gating. In response, clock gating control logic module 101 generates a gating enabled first clock control signal 102. Power and clock gating control logic module 103 receives the gating enabled first clock control signal 102. Power and clock gating control logic module 103 also generates a gating enabled second clock control signal 104. First logic gate 107 receives the gating enabled second clock control signal 104 and the first clock signal 106 generated by clock generator 105. In response, first logic gate 107 generates a gating enabled second clock signal 108. Particular logic block 109 receives the gating enabled second clock signal 108, preventing particular logic block 109 from operating in response to first clock signal 106.

In the illustrative operative embodiment, power and clock gating control module 103 generates an isolation enabled isolation control logic module signal 116. Isolation control logic module 120 receives the isolation enabled isolation control logic module signal 116, which activates isolation control logic module 120. Isolation control logic module 120 isolates logic block 109 from core processor 121, indicating to core processor that particular logic block 109 is inactive rather than an unknown element.

In the illustrative operative embodiment, power and clock gating control module 103 also generates a power disabled power control signal 115. Header/footer module 122 receives the power disabled power control signal 115 and interrupts the flow of power to particular logic block 109. Header/footer module 122 also generates power status signal 119, which power and clock gating control module 103 receives, indicating to power and clock gating control module 103 that particular logic block 109 is no longer powered.

In the illustrative operative embodiment, in the event that core processor 121 needs logic block 109, system 100 activates first clock gating control logic 101, which generates a gating disabled first clock control signal 102. Power and clock gating control logic module 103 receives the gating disabled first clock control signal 102, checks power status signal 119, and in the event that power status signal 119 indicates particular logic block 109 receives power, transmits a gating disabled second clock control signal 104. First logic gate 107 receives the gating disabled second clock control signal 104 and first clock signal 106 and generates a gating disabled second clock signal 108 enabling particular logic block 109 to operate in response to first clock signal 106.

In the illustrative operative embodiment, in the event that power status control signal 119 does not indicate that particular logic block 109 receives power, power and clock gating control logic module 103 generates a gating enabled fourth clock control signal 114. Third logic gate 117 receives the gating enabled fourth clock control signal 114 and the fourth clock signal 123 and generates a gating enabled fifth clock signal 118 in response. Gating enabled fifth clock signal 118 disables the clock of core processor 121, causing core processor 121 to stand idle. Power and clock gating control logic module 103 also generates a power enabled power control signal 115, and an isolation disabled isolation control logic module signal 116.

In the illustrative operative embodiment, header/footer module 122 receives the power enabled power control signal 115 and enables power to logic block 109. Header/footer module 122 generates power status signal 119 in response. Isolation control logic module 120 receives the isolation disabled isolation control logic module signal 116 and enables communication between particular logic block 109 and processor core 121. When power status signal 119 indicates that particular logic block 109 receives power, power and clock gating control module 103 generates a gating disabled second clock control signal 104, and a gating disabled fourth clock control signal 114. First logic gate 107 receives the gating disabled second clock control signal 104 and first clock signal 106 and generates a second clock signal 108 enabling particular logic block 109 to operate in response to the clock signal. Third logic gate 117 receives the gating disabled fourth clock control signal 114 and the fourth clock signal 123 and generates a fifth clock control signal 118 in response. Fifth clock control signal 118 enables the clock of core processor 121, which allows core processor 121 to operate in an otherwise conventional manner.

Thus, generally, system 100 illustrates a hardware implementation of the present method for reducing processor power consumption. The implementation illustrated in system 100 of FIG. 1 allows a system to use power gating without otherwise modifying the system software. In an alternative embodiment, power gating is performed within software modification. For example, FIG. 2 illustrates system 200, an alternative embodiment, wherein the method implements the control functions performed by power and clock gating control logic module 103 of system 100 through hardware elements and object or machine code.

Figure 2:
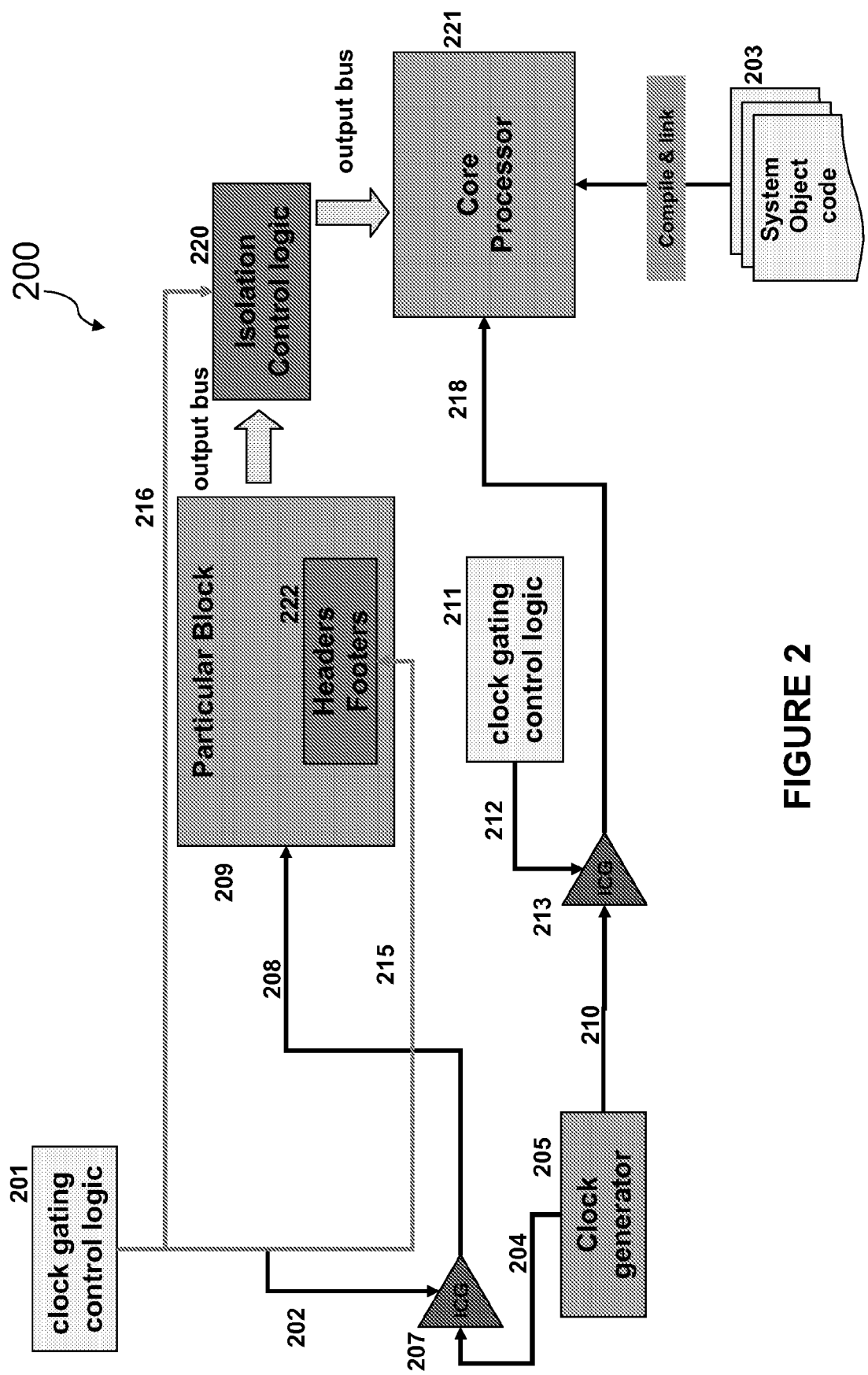
FIG. 2 is a block diagram of a hardware and software embodiment of the present invention in accordance with one embodiment.

Specifically, System 200 of FIG. 2 comprises the following hardware and software elements: a first clock gating control module 201, a first clock control signal 202, a system instructions 203, a first clock signal 204, a clock generator 205, a first logic gate 207, a second clock signal 208, a particular logic block 209, a third clock signal 210, a second clock gating control module 211, a second clock control signal 212, a second logic gate 213, a power signal 215, an isolation control signal 216, a fourth clock signal 218, an isolation control logic module 220, a core processor 221, and a header/footer module 222.

In the illustrated embodiment, system instructions 203 comprises computer instructions that enable system 200 to perform various functions. System 200 implements system instructions 203 through core processor 221. In the illustrated embodiment, system instructions 203 includes instructions that control clock and power gating of system 200 in order to reduce processor power consumption.

In the illustrated embodiment, first clock gating control module 201 comprises logic circuitry that upon receiving an appropriate instruction from system instructions 203, generates the appropriate signals to enable clock and power gating. Specifically, first clock gating control module 201 generates first clock control signal 202, isolation control signal 216, and power signal 215. First clock gating control signal 202 comprises an instruction to enable or disable clock gating for particular logic block 209. Isolation control signal 216 comprises an instruction to isolate or not isolate particular logic block 209. Power signal 215 comprises an instruction to enable or disable power for particular logic block 209.

In the illustrated embodiment, first logic gate 207 comprises a combinatorial logic function, such that when first logic gate 207 receives a signal corresponding to a clock gating enabled instruction via first clock control signal 202, first logic gate 207 does not propagate first clock signal 204. Conversely, when first logic gate 207 receives a clock gating disabled instruction via first clock control signal 202, first logic gate 207 propagates first clock signal 204 as second clock signal 208, enabling the clock of particular logic block 209.

In the illustrated embodiment, clock generator 205 comprises logic circuitry that generates clock signals, which operate the clocks of synchronous elements. Those synchronous elements perform their designated function in response to the clock signal. As shown in FIG. 2, clock generator 205 generates first clock signal 204 which operates the clock of particular logic block 209 and third clock signal 210 which operates the clock of core processor 221.

In the illustrated embodiment, second logic gate 213 comprises a combinatorial logic function, such that when second logic gate 213 receives a signal corresponding to a clock gating enabled instruction via second clock control signal 212, second logic gate 213 does not propagate third clock signal 210. Conversely, when second logic gate 213 receives a signal corresponding to a clock gating disabled instruction via second clock control signal 212, second logic gate 213 propagates third clock signal 210 as fourth clock signal 218, enabling the clock of core processor 221.

In the illustrated embodiment, second clock gating control module 211 comprises logic circuitry that upon receiving an appropriate instruction from system instructions 203, generates the appropriate signals to enable clock and power gating. Specifically, second clock gating control module 211 generates second clock control signal 212. Second clock control signal 212 comprises an instruction to enable or disable clock gating.

In the illustrated embodiment, particular logic block 209 is an optional logic block. For example, in various systems particular logic block 209 comprises memory built in self test (MBIST) circuitry or otherwise optional modules. Particular logic block 209 is configured to receive second clock signal 208 and operate in response to an enable clock signal.

The present method inserts header/footer logic module 222 into particular logic block 209. Header/footer logic module 222 comprises logic circuitry placed between the power source and particular logic block 209 or between particular logic block 209 and the ground. When header/footer logic module 222 receives a power gating enabled signal from power and clock gating control logic module, header/footer logic module 222 performs the operative functions necessary to interrupt the power supply to particular logic block 209. Specifically, header/footer logic module 222 receives power signal 215, which comprises an instruction to enable or disable power gating.

In the illustrated embodiment, particular logic block 209 communicates with isolation control logic module 220 through a system bus. In turn, isolation control logic module 220 communicates with core processor 221 through a system bus. Isolation control logic module 220 comprises logic circuitry configured to represent to core processor 221 that particular logic block 209 is not an unknown element. Isolation control logic module 220 receives isolation control signal 216 and in response, controls communication between particular logic block 209 and processor core 221. Isolation control signal 216 comprises an instruction to isolate or not isolate particular logic block 209 from core processor 221.

In the illustrated embodiment, core processor 221 comprises circuitry designed to perform operative functions similar to that of a typical processor. As shown in FIG. 2, core processor 221 executes system instructions 203, which allows system 200 to perform executable functions. For instance, system object code could comprise instructions to perform the clock gating process to reduce dynamic power.

In the illustrative operative embodiment, system instructions 203, through core processor 221, instructs system 200 to enable clock and power gating. In response, clock gating control logic module 201 generates a clock gating enabled first clock control signal 202, which is received by first logic gate 207. First logic gate 207 does not propagate first clock signal 204, thus disabling the clock of particular logic block 209, saving dynamic power. Clock gating control logic module 201 also generates a power gating enabled power signal 215, and an isolation enabled isolation control signal 216. In response, header/footer module 222 interrupts the power supply to particular logic block 209. Isolation control logic module 220 receives the isolation enabled control signal 216 and interrupts communication between particular logic block 209 and core processor 221, representing to core processor 221 that particular logic block 209 is unavailable and not an unknown element.

In the illustrative operative embodiment, system instructions 203, through core processor 221, instructs system 200 to disable power and clock gating. In response, second clock gating control signal 211 generates a clock gating enabled second clock control signal 212. Second logic gate 213 does not propagate third clock signal 210, thus disabling the clock of core processor 221. Core processor 221 stands idle until the power supply of particular logic block 209 is ready. First clock gating control logic module 201 generates a power gating disabled power signal 215. Header and footer module 222 reestablishes the connection between the power supply and particular logic block 209. Additionally, first clock gating control logic module 201 generates an isolation disabled isolation control signal 216. In response, isolation control logic module 220 re-establishes communication between particular logic block 209 and core processor 221.

In the illustrative operative embodiment, when the power supply to particular logic block 209 has been re-established, first clock gating control logic module 201 generates a clock gating disabled first clock control signal 202. In response, first logic gate 207 propagates first clock signal 204 as second clock signal 208, enabling the clock of particular logic block 209. Second clock gating control logic module 211 generates a clock gating disabled second clock control signal 212. In response, second logic gate 213 propagates third clock signal 210 forward as fourth clock signal 218, enabling the clock of core processor 221. Thus generally, system 200 of FIG. 2 illustrates a method for reducing processor power consumption implemented in hardware and system object or machine code.

The elements of system 200 can take many forms, one of which is illustrated by FIG. 3. Specifically, FIG. 3 illustrates system instructions 203 in more detail. System instructions 203 comprises instructions to enable a target block, which instructs first clock gating control module 201 of system 200 to perform the necessary operations to enable particular logic block 209. System instructions 203 also comprises an instruction to wait until power supply is ready that, when executed by core processor 221, instructs second clock gating control logic module 211 of system 200 to disable the clock of core processor 221 until particular logic block 209 is powered. Finally, system instructions 203 also comprises an instruction to disable target block. This instruction, when executed by core processor 221 instructs first clock gating control logic module 201 to generate the appropriate signals to enable clock and power gating of particular logic block 209 of system 200, thus saving both dynamic and leakage power.

Figure 4:
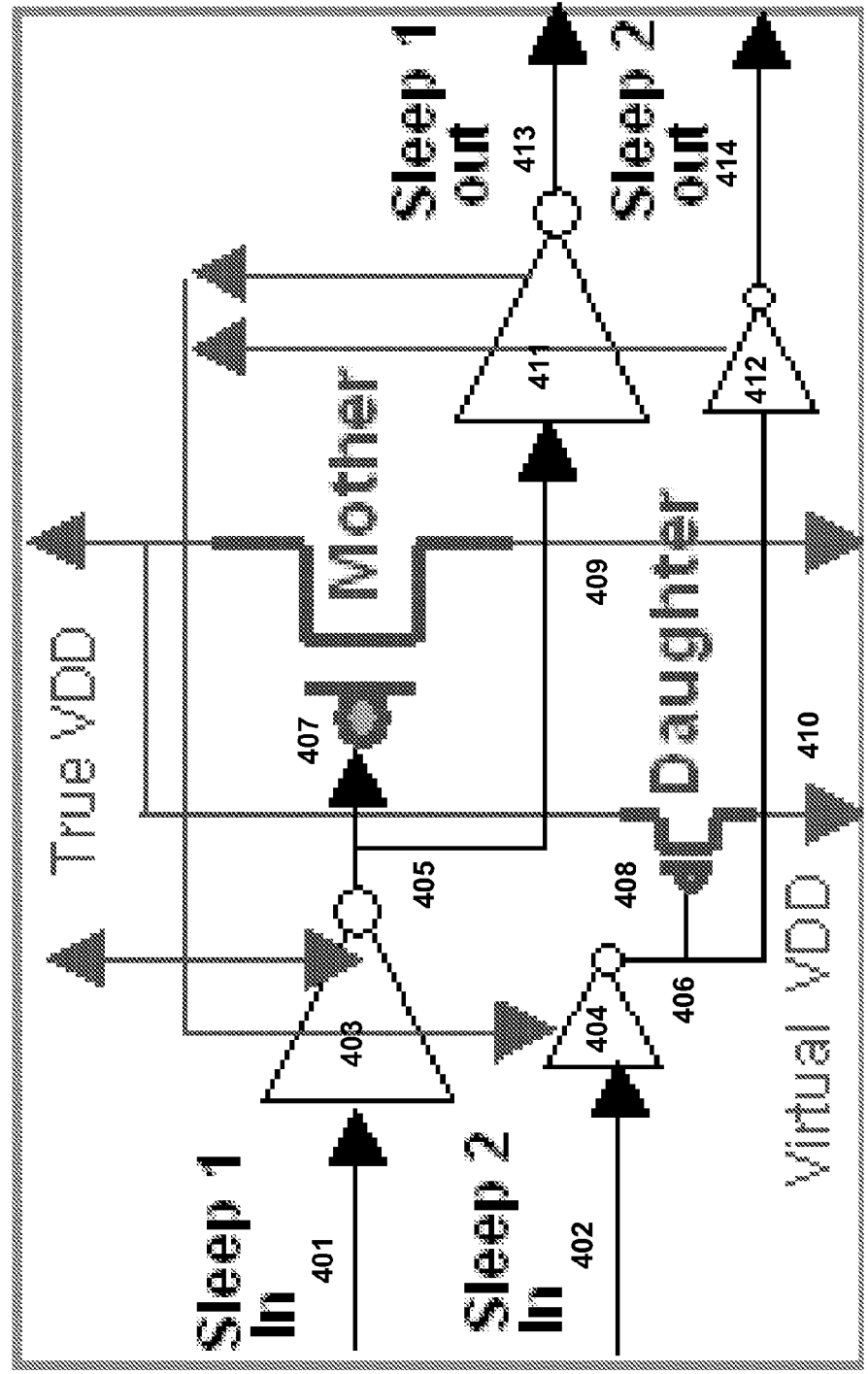
FIG. 4 is a schematic diagram of an implementation of a header/footer module in accordance with an embodiment of the present invention.

Both header/footer module 122 of system 100 and header/footer module 222 of system 200 can take the form shown in FIG. 4. In the illustrated embodiment, header/footer module 122/222 comprises logic circuitry placed as a header between the power supply and the optional block, or a footer between the optional block and the ground, such that the header can interrupt power to the optional block. In one embodiment, header/footer module 122/222 comprises a first input signal 401, a second input signal 402, a first not gate 403, a second not gate 404, a first signal 405, a second signal 406, a first PMOS 407, a second PMOS 408, a first power supply signal 409, a second power supply signal 410, a third not gate 411, a fourth not gate 412, a first output signal 413, and a second output signal 414.

In an illustrative operative embodiment of header/footer module 122/222 of FIG. 4, when first input signal 401 and second input signal 402 comprise a power gating enabled signal, first not gate 403 generates a power disabled first signal 405, and second not gate 404 generates a power disabled second signal 406. First PMOS 407 receives power disabled first signal 405, turning first PMOS 407 off, preventing the flow of power along first power supply signal 409. Third not gate 411 receives the power disabled first signal 405 and generates a power gating enabled first output signal 413. Similarly, second PMOS 408 receives power disabled second signal 406, turning second PMOS 408 off, preventing the flow of power along second power supply signal 410. Fourth not gate 412 receives the power disabled second signal 406 and generates a power gating enabled second output signal 414.

In the illustrative operative embodiment of header/footer module 122/222 of FIG. 4, when first input signal 401 and second input signal 402 comprise a power gating disabled signal, first not gate 403 generates a power enabled first signal 405, and second not gate 404 generates a power enabled second signal 406. First PMOS 407 receives power enabled first signal 405, turning first PMOS 407 on, allowing the flow of power along first power supply signal 409. Third not gate 411 receives the power enabled first signal 405 and generates a power gating disabled first output signal 413. Similarly, second PMOS 408 receives power enabled second signal 406, turning second PMOS 408 on, allowing the flow of power along second power supply signal 410. Fourth not gate 412 receives the power enabled second signal 406 and generates a power gating disabled second output signal 414. Thus, generally, header/footer module 122/222 disables the power supply to an optional block.

Figure 5:
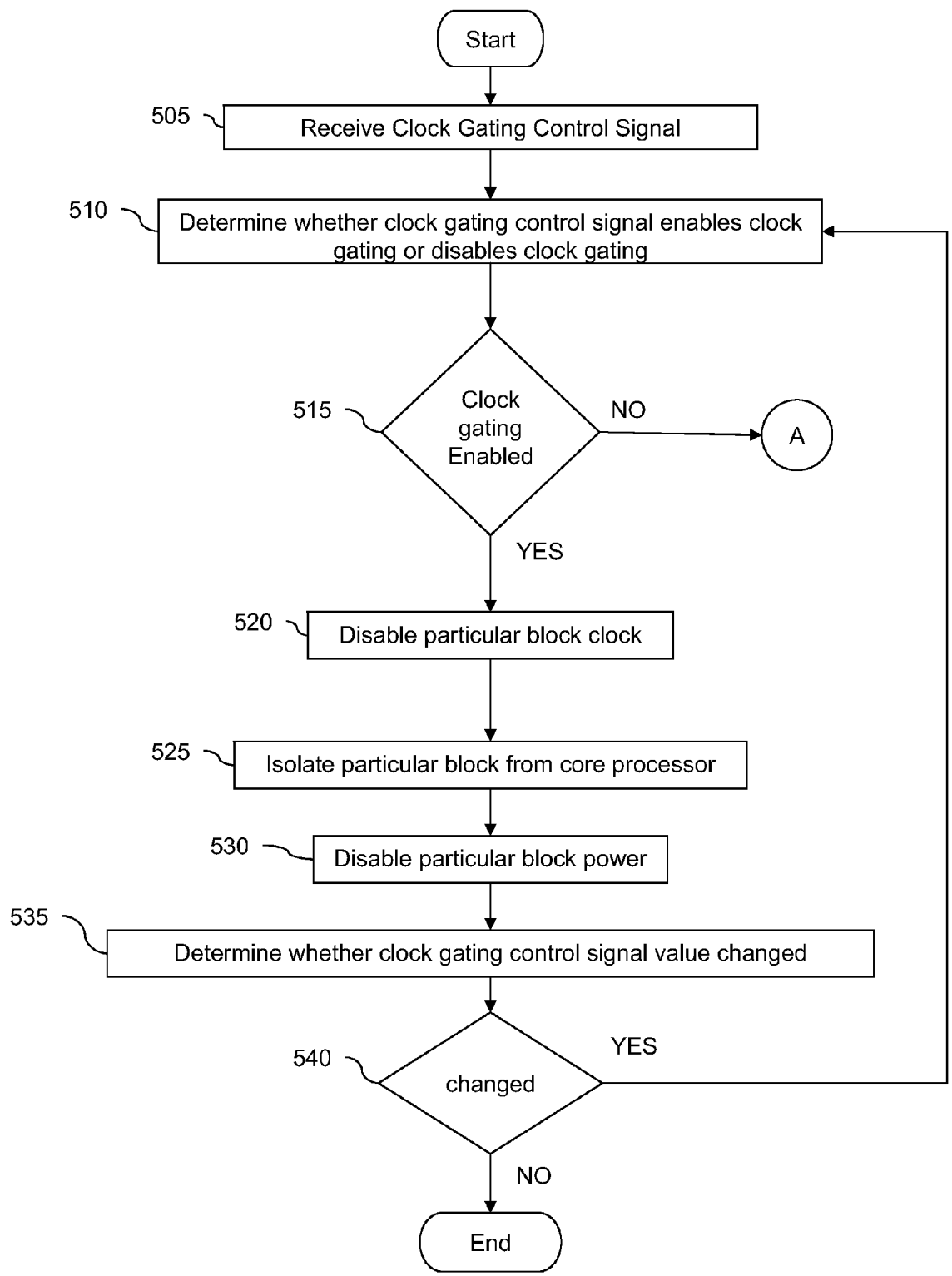
FIG. 5 is a high-level flow diagram of the operation of the power saving method in accordance with a preferred embodiment.
Figure 6:
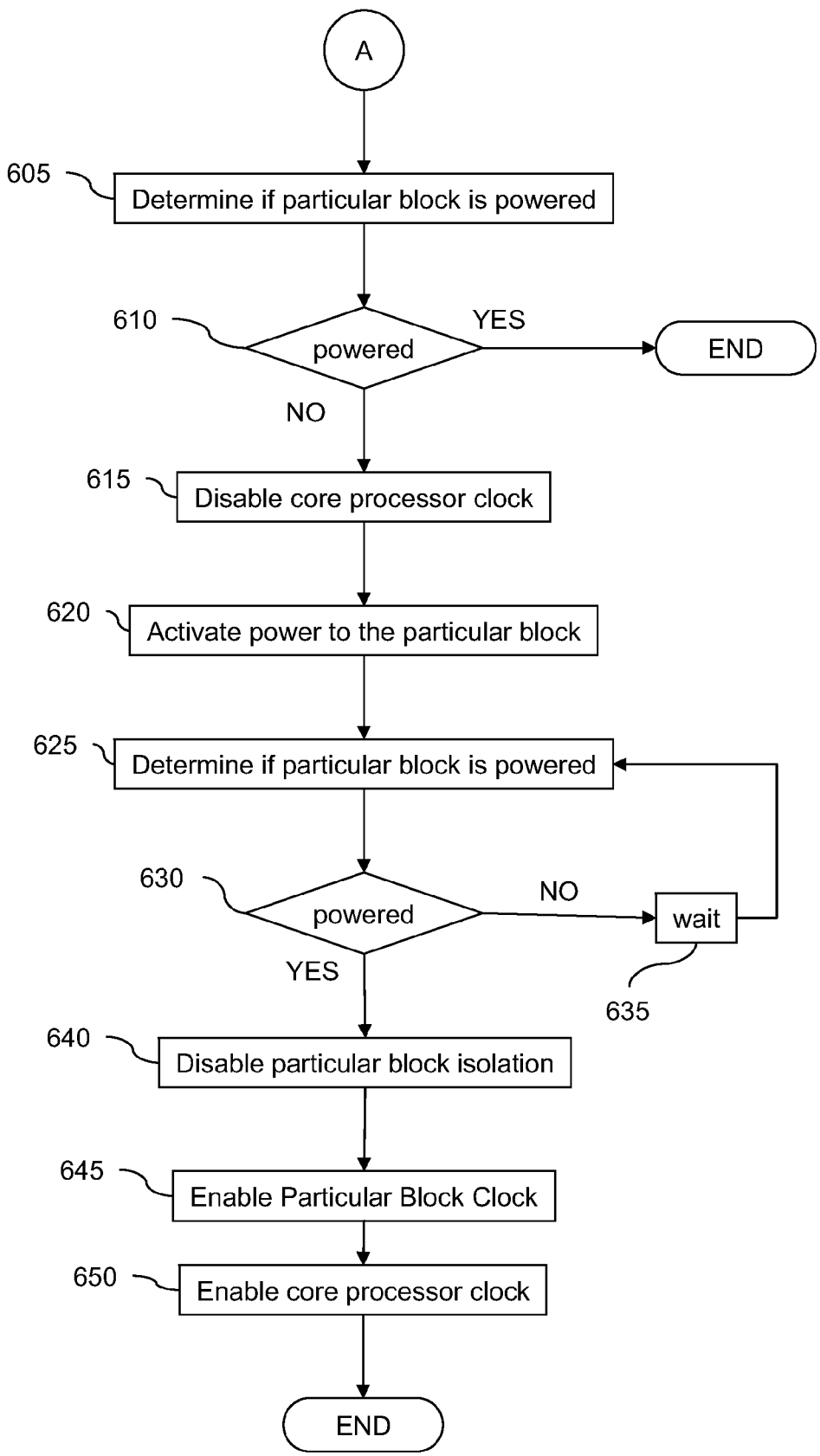
FIG. 6 is a high-level flow diagram of the operation of the power saving method in accordance with a preferred embodiment.

Both system 100 of FIG. 1 and system 200 of FIG. 2 operate as described with reference to FIG. 5 and FIG. 6. FIG. 5 and FIG. 6 illustrate a high-level flow chart of system 500 and system 600, respectively, which depict logical operational steps performed by, for example, system 100 of FIG. 1, which may be implemented in accordance with a preferred embodiment. As indicated at block 505, the process begins when system 100 receives a clock gating control signal. For example, power and clock gating control module 103 receives first clock gating control signal 102. Next, as indicated at block 510, system 100 determines whether the clock gating control signal enables clock gating. For example, power and clock gating control module 103 determines whether first clock control signal 102 indicates gating enabled or gating disabled. As indicated by decisional block 515, in the event that clock gating is disabled, the process continues along the NO path to block 605 of FIG. 6, as indicated by marker A.

As indicated at decisional block 515, in the event that the clock gating is enabled, the process continues along the YES path to block 520. Next, as indicated at block 520, system 100 disables the clock of the particular logic block. For example, power and clock gating control logic module 103 disables the clock of particular logic block 109. Next, as indicated at block 525, system 100 isolates the particular logic block from the core processor. For example, power and clock gating control logic module 103 instructs isolation control logic module 120 to isolate particular logic block 109.

Next, as indicated at block 530, system 100 disables the power to the particular logic block. For example, power and clock gating control logic module 103 performs the operative steps described above to disable power to logic block 109. Next as indicated at block 535, system 100 determines whether the clock gating control signal value has changed.

For example, power and clock gating control logic module 103 determines whether first clock gating control signal 102 has changed.

As indicated at decisional block 540, in the event that the clock gating control signal has changed, the process continues on the YES path to block 510 where system 100 determines whether the clock gating control signal indicates gating enabled or gating disabled. As indicated at decisional block 540, in the event that the clock gating control signal has not changed, the process continues on the NO path where the process ends. Thus ends the method as illustrated by system 500 of FIG. 5. As indicated at decisional block 515, in the event that clock gating is disabled, the process continues along the NO path to block 605 of system 600, illustrating the activation sequence of the particular logic block after a period in which power was removed from the particular logic block.

As indicated at block 605, system 100 determines the power status of the particular logic block. For example, power and gating control logic module 103 checks the status of the power at particular logic block 109 through power status signal 119. As indicated at decisional block 610, in the event that the logic block is receiving power, the process continues on the YES path and ends. As indicated at decisional block 610, in the event that power is not being supplied to the particular logic block, system 100 continues along the NO path to block 615, where system 100 disables the core processor clock. For example, power and gating control logic module 103 performs the operative steps described above to disable the clock of core processor 121.

Next, as indicated at block 620, system 100 activates power to the particular logic block. For example, power and clock gating control module 103 performs the operative steps described above to enable power to particular logic block 109. Next, as indicated at block 625, system 100 determines the status of the power supply to the particular logic block. For example, power and clock gating control module 103 determines the status of power to particular logic block 109.

Next, as indicated at decisional block 630, in the event that no power is supplied to the particular logic block, system 100 continues on the NO path to block 635, where system 100 waits, and returns to block 625. As indicated at decisional block 630, in the event that power is supplied to the particular logic block, system 100 continues on the YES path to block 640, where system 100 disables the logic block isolation. For example, power and clock gating control logic module 103 signals isolation control logic module 120 to disable isolation.

Next, as indicated at block 645, system 100 enables the clock of the particular logic block. For example, power and clock gating control logic module 103 performs the operative steps described above to enable the clock of particular logic block 109. Next, as indicated at block 650, system 100 enables the clock of the core processor. For example, power and clock gating control module 103 performs the operative steps described above to enable the clock of core processor 121. Thus, generally, system 100 reduces total power consumption of a system by clock gating and power gating, i.e. removing power from inactive logic blocks so that leakage power loss ceases.

Accordingly, the disclosed embodiments provide numerous advantages over other methods and systems. For example, while the prior methods of clock gating saved dynamic power, the illustrated method saves dynamic and leakage power, thereby reducing the total power loss of the system during operation. This method eliminates the power draw that occurs when the elements do not operate while inactive during clock gating.

Additionally, prior art systems typically achieved leakage power savings by powering down all elements of a system except that which was needed to restart the inactive blocks. This incurred a serious time penalty, while the system waited until those blocks received power. The proposed method reduces the wake up penalty by only power gating those individual elements that are inactive, thus significantly reducing the total time necessary to bring all elements back to active status.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that the operative steps of the method may be varied while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for reducing processor power consumption comprising:
   receiving a clock gating control instruction for a particular logic block, wherein the clock gating control instruction comprises an instruction to selectively enable or disable a clock signal;
   in the event that the clock gating control instruction disables the clock signal to the particular logic block, isolating the particular logic block from a core processor, and disabling power to the particular logic block; and
   in the event that the clock gating control instruction enables the clock signal to the particular logic block and the particular logic block does not receive power, disabling a clock of the core processor, and tracking power status for the particular logic block, wherein in the event that the particular logic block receives power, re-activating the particular logic block and enabling the clock of the core processor.

2. The method of claim 1, wherein isolating the particular logic block from a core processor further comprises:
   activating an isolation control logic module; and
   disabling the clock of the particular logic block.

3. The method of claim 1, wherein disabling power to the particular logic block further comprises:
   activating a logic module to interrupt power to the particular logic block; and
   tracking power status for the particular logic block.

4. The method of claim 2, wherein disabling power to the particular logic block further comprises:
   activating a logic module to interrupt power to the particular logic block; and
   tracking power status for the particular logic block.

5. The method of claim 4, wherein re-activating the particular logic block further comprises:
- deactivating the logic module interrupting power to the particular logic block;
- in the event that the particular logic block receives power, deactivating the logic module isolating the particular logic block; and
- enabling the clock of the particular logic block.

6. A non-transitory computer readable medium containing software instructions, that, when executed by a processor reduce processor power consumption by:
- receiving a clock gating control instruction for a particular logic block, wherein the clock gating control instruction comprises an instruction to selectively enable or disable a clock signal;
- in the event that the clock gating control instruction disables the clock signal to the particular logic block, isolating the particular logic block from a core processor, and disabling power to the particular logic block; and
- in the event that the clock gating control instruction enables the clock signal to the particular logic block and the particular logic block does not receive power, disabling a clock of the core processor, and tracking power status for the particular logic block, wherein in the event that the particular logic block receives power, re-activating the particular logic block and enabling the clock of the core processor.

7. The non-transitory computer readable medium containing software instructions of claim 6, wherein software instructions for isolating the particular logic block from a core processor comprise additional software instructions, that, when executed by a processor:
- activate an isolation control logic module; and
- disable the clock of the particular logic block.

8. The non-transitory computer readable medium containing software instructions of claim 6, wherein software instructions that disable power to the particular logic block comprise additional instructions, that, when executed by a processor:
- activate a logic module to interrupt power to the particular logic block; and
- track power status for the particular logic block.

9. The non-transitory computer readable medium containing software instructions of claim 7, wherein software instructions that disable power to the particular logic block comprise additional instructions, that, when executed by a processor:
- activate a logic module to interrupt power to the particular logic block; and
- track power status for the particular logic block.

10. The non-transitory computer readable medium containing software instructions of claim 9, wherein software instructions that reactivate the particular logic block comprise additional instructions, that, when executed by a processor:
- deactivate the logic module interrupting power to the particular logic block;
- in the event that the particular logic block receives power, deactivate the logic module isolating the particular logic block; and
- enable the clock of the particular logic block.

11. A system for reducing processor power consumption comprising:
- a clock gating control logic module, coupled to a power and clock gating control logic module, and configured to selectively transmit a first clock gating control signal;
- the power and clock gating control logic module, further coupled to a header/footer module, an isolation control logic module, a first logic circuitry, and a second logic circuitry, and configured to receive the first clock gating control signal, and a power status signal, and selectively transmit a second clock gating control signal, a power control signal, an isolation control signal, and a third clock gating control signal;
- the header/footer module, further coupled to a particular logic block, and configured to receive the power control signal, and selectively transmit the power status signal;
- the isolation control logic module, further coupled to the particular logic block and a core processor, and configured to receive the isolation control signal;
- the particular logic block, further coupled to the first logic circuitry, and configured to receive a second clock signal;
- the first logic circuitry, further coupled to a clock generator, and configured to receive a first clock signal and the second clock control signal, and transmit the second clock signal;
- the clock generator, further coupled to a third logic circuitry, and configured to generate the first clock signal and a third clock signal;
- the second logic circuitry, further coupled to the core processor and configured to receive the third clock control signal and a fourth clock control signal, and transmit a fourth clock signal;
- the third logic circuitry, further coupled to a second clock control logic module, and configured to receive the third clock signal and a fifth clock control signal and transmit the fourth clock control signal;
- the second clock control logic module, configured to transmit the fifth clock control signal; and
- the core processor, configured to receive the fourth clock signal.

12. The system of claim 11, wherein the power and clock gating control logic module receives the first clock gating control signal from the clock gating control logic module, and in response, implements logic operations to control the second clock signal to the particular logic block, implements logic operations to control the fourth clock signal to the core processor, implements logic operations to control power to the particular logic block, and implements logic operations to isolate the particular logic block.

13. The system of claim 11, wherein header/footer module further comprises logic operations to disable power to the particular logic block.

14. The system of claim 11, wherein isolation control logic module further comprises logic operations to isolate the particular logic block from the core processor.

15. The system of claim 11, wherein power and clock control logic module further comprises executable instructions that may be performed by a processor.

16. The system of claim 11, wherein header/footer module further comprises executable instructions that may be performed by a processor.

17. The system of claim 11, wherein isolation control logic module further comprises executable instructions that may be performed by a processor.

18. The system of claim 11, wherein header/footer module further comprises:
- a first not gate having an output coupled to an input of a first PMOS and a second not gate, and configured to receive a first power signal;
- the first PMOS further coupled to a power supply and the particular logic block;
- the second not gate configured to receive the output of the first not gate;

a third not gate having an output coupled to an input of a second PMOS and a fourth not gate, and configured to receive a second power signal;
the second PMOS further coupled to the power supply and the particular logic block; and
the fourth not gate configured to receive the output of the third not gate.

19. The system of claim 11, wherein header/footer module further comprises:
a first not gate having an output coupled to an input of a first PMOS and a second not gate, and configured to receive a first power signal;
the first PMOS further coupled to the particular logic block and a ground;
the second not gate configured to receive the output of the first not gate;
a third not gate having an output coupled to an input of a second PMOS and a fourth not gate, and configured to receive a second power signal;
the second PMOS further coupled to the particular logic block and a ground; and
the fourth not gate configured to receive the output of the third not gate.

20. The system of claim 11, wherein second logic circuitry comprises an AND gate.

* * * * *